United States Patent
Edsall et al.

(10) Patent No.: US 10,432,628 B2
(45) Date of Patent: Oct. 1, 2019

(54) METHOD FOR IMPROVING ACCESS CONTROL FOR TCP CONNECTIONS WHILE OPTIMIZING HARDWARE RESOURCES

(71) Applicant: Cisco Technology, Inc., San Jose, CA (US)

(72) Inventors: Thomas J. Edsall, Los Gatos, CA (US); Smita Rai, Mountain View, CA (US); Satyam Sinha, Sunnyvale, CA (US); Kit Chiu Chu, Fremont, CA (US); Sarang Dharmapurikar, Cupertino, CA (US); Ashutosh Agrawal, Fremont, CA (US); Ravikanth Nasika, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 624 days.

(21) Appl. No.: 15/051,454

(22) Filed: Feb. 23, 2016

(65) Prior Publication Data

US 2017/0244645 A1    Aug. 24, 2017

(51) Int. Cl.
*H04L 29/06* (2006.01)
*H04L 12/911* (2013.01)
*H04L 12/725* (2013.01)

(52) U.S. Cl.
CPC .............. *H04L 63/10* (2013.01); *H04L 45/30* (2013.01); *H04L 47/70* (2013.01); *H04L 63/08* (2013.01); *H04L 63/101* (2013.01); *H04L 63/105* (2013.01); *H04L 63/20* (2013.01)

(58) Field of Classification Search
CPC ....... H04L 63/10; H04L 63/20; H04L 63/101; H04L 63/105; H04L 45/30; H04L 63/08; H04L 47/70
See application file for complete search history.

(56) References Cited

U.S. PATENT DOCUMENTS 5,173,939 A * 12/1992 Abadi .................... G06F 9/468
6,658,002 B1    12/2003 Ross et al.
(Continued)

OTHER PUBLICATIONS

Hwang, Haesung et al., "A New TCAM Architecture for Managing ACL in Routers," IEICE Transactions on Communications, vol. E93-B, pp. No. 3004-3012, Nov. 2010.

*Primary Examiner* — Ramy M Osman
(74) *Attorney, Agent, or Firm* — Polsinelli LLP

(57) ABSTRACT

Disclosed are systems, methods, and computer-readable storage media for minimizing the number of entries in network access control lists (ACLs). In some embodiments of the present technology a networking device can receive, from a first computing device, a first data transmission intended for a second computing device, the first data transmission including first transmission data. The networking device can normalize at least a subset of the first transmission data based on a predetermined normalization algorithm, yielding a first normalized data set for the first data transmission. Subsequently, the networking device can identify a first access control list entry from a set of access control list entries based on the first normalized data set, the first access control list entry identifying a first action, and implement the first action in relation to the first data transmission.

18 Claims, 14 Drawing Sheets

(56) References Cited

U.S. PATENT DOCUMENTS

| | | | |
|---|---|---|---|
| 7,007,032 B1 * | 2/2006 | Chen | G06F 7/22 |
| | | | 707/693 |
| 7,133,914 B1 * | 11/2006 | Holbrook | H04L 45/7453 |
| | | | 709/224 |
| 7,366,830 B1 * | 4/2008 | Maheshwari | G11C 15/00 |
| | | | 365/49.17 |
| 7,904,642 B1 * | 3/2011 | Gupta | G06F 17/30982 |
| | | | 711/108 |
| 7,925,666 B1 * | 4/2011 | Johnson | H04L 63/101 |
| | | | 707/781 |
| 8,750,144 B1 * | 6/2014 | Zhou | H04L 45/54 |
| | | | 370/252 |
| 10,205,658 B1 * | 2/2019 | Revah | H04L 45/74 |
| 2004/0260949 A1 * | 12/2004 | Aoki | H04L 63/08 |
| | | | 726/8 |
| 2007/0016583 A1 * | 1/2007 | Lempel | G06F 21/6218 |
| 2007/0183416 A1 * | 8/2007 | Gooch | H04L 45/30 |
| | | | 370/389 |
| 2009/0052451 A1 * | 2/2009 | Etheridge | H04L 63/101 |
| | | | 370/392 |
| 2009/0089413 A1 * | 4/2009 | Kamei | H04L 61/1582 |
| | | | 709/223 |
| 2011/0022691 A1 * | 1/2011 | Banerjee | H04L 49/10 |
| | | | 709/221 |
| 2011/0055578 A1 * | 3/2011 | Resch | H04L 63/10 |
| | | | 713/176 |
| 2014/0075108 A1 | 3/2014 | Dong et al. | |
| 2014/0082122 A1 | 3/2014 | Basso et al. | |
| 2015/0127900 A1 | 5/2015 | Dharmapurikar et al. | |
| 2017/0244645 A1 * | 8/2017 | Edsall | H04L 47/70 |

* cited by examiner

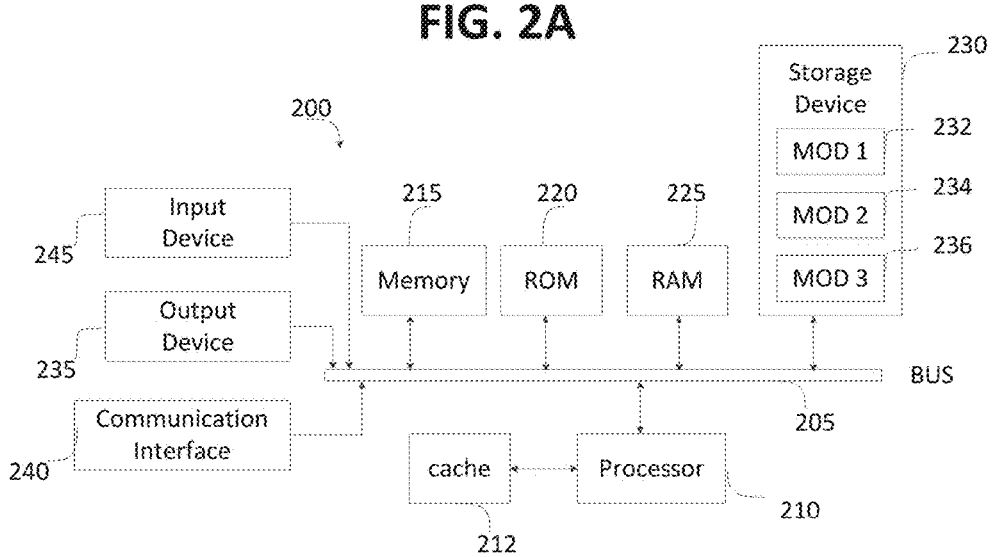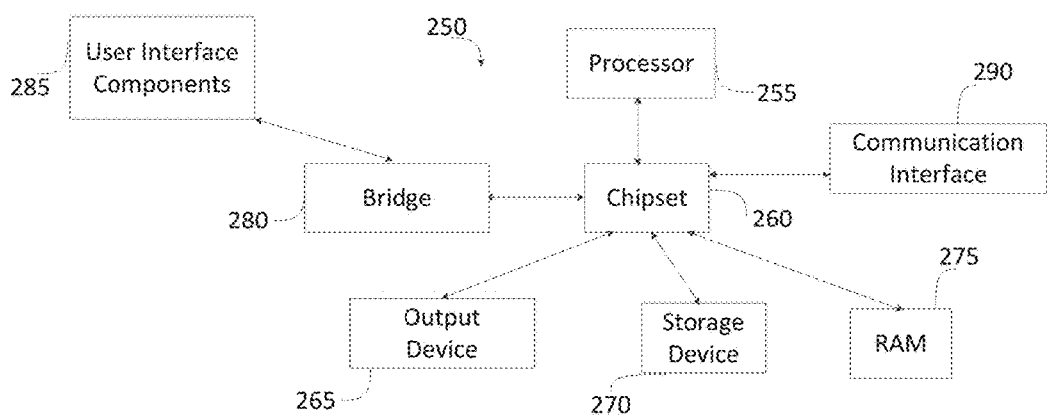

METHOD FOR IMPROVING ACCESS CONTROL FOR TCP CONNECTIONS WHILE OPTIMIZING HARDWARE RESOURCES

TECHNICAL FIELD

The present technology pertains to access control for data transmissions and more specifically pertains to reducing access control list entries to minimize hardware usage in routing and/or switching equipment.

BACKGROUND

Routing and/or switching equipment can be configured to enforce access control policies for data communication sessions between endpoints. For example, a router or switch can maintain and utilize an Access Control List (ACL) that dictates whether data transmissions between endpoints should be granted or denied. Each ACL entry can identify an appropriate action (e.g., allow or deny a transmission) based on transmission data associated with the data transmission. Examples of transmission data can include the source port, destination port, source end point group, destination end point group, whether the transmission is an acknowledgement, reset or fragment, etc.

To reduce network latency, routing and switching equipment can be equipped with high speed memory, such as ternary content-addressable memory (TCAM), which searches its entire contents in a single clock. These types of high speed memory can be expensive to build, consume a lot of power, generate a high level of heat, and are therefore often limited in storage capacity. As such, network operators must be economical with their ACL entries. Current practices of minimizing ACL entries often involve the use of blanket access control rules. For example, to reduce the number of ACL entries, administrators will often set restrictions for initial packet traffic to specified port, but permit all acknowledgement packets for each port rather than create a separate ACL entry for each. While this reduces the number of ACL entries, it can also lead to attacks, malicious servers or host attacks.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which:

FIGS. 2A and 2B illustrate an example system embodiments according to some aspects of the subject technology;

DESCRIPTION OF EXAMPLE EMBODIMENTS

Figure 1:
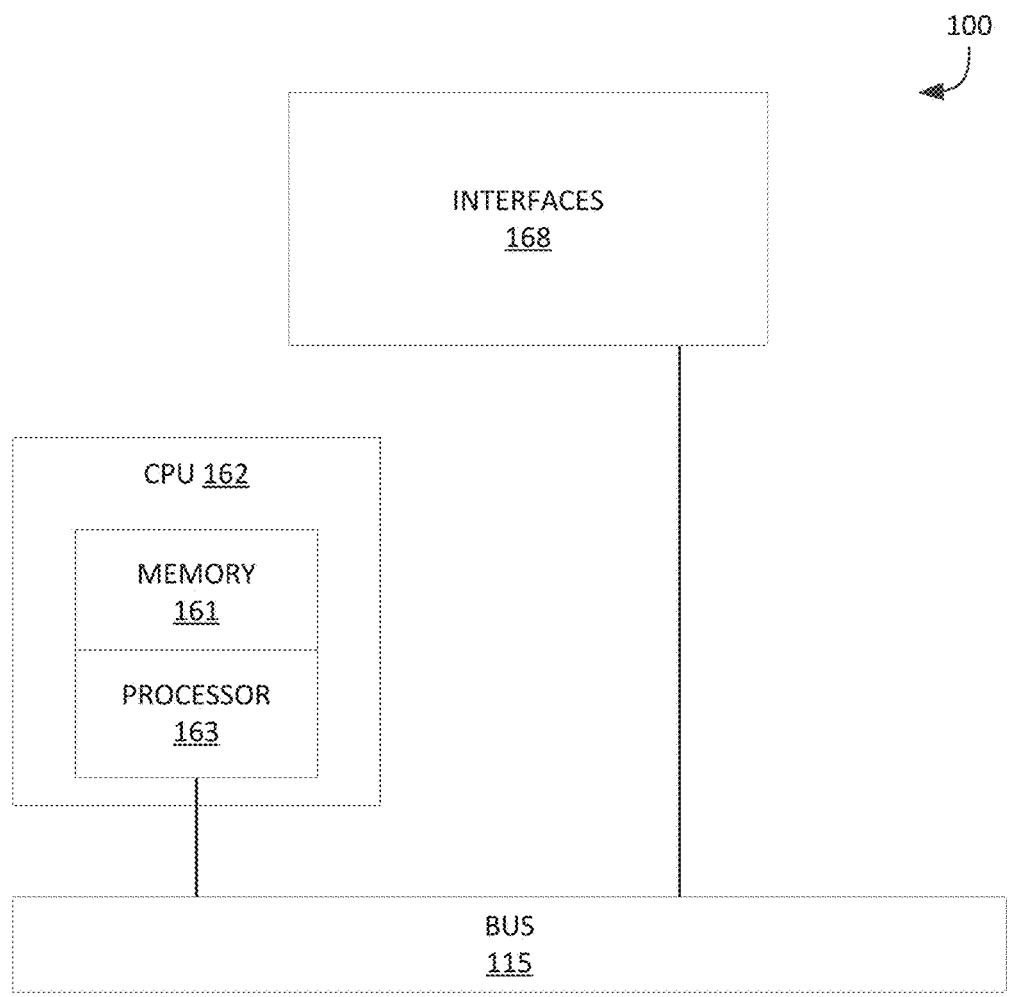
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for minimizing the number of entries in network access control lists (ACLs) while providing greater control and security for network traffic related to the ACLs. In some embodiments of the present technology a networking device can receive, from a first computing device, a first data transmission intended for a second computing device, the first data transmission including first transmission data. The networking device can normalize at least a subset of the first transmission data based on a predetermined normalization algorithm, yielding a first normalized data set for the first data transmission. Subsequently, the networking device can identify a first access control list entry from a set of access control list entries based on the first normalized data set, the first access control list entry identifying a first action, and implement the first action in relation to the first data transmission.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
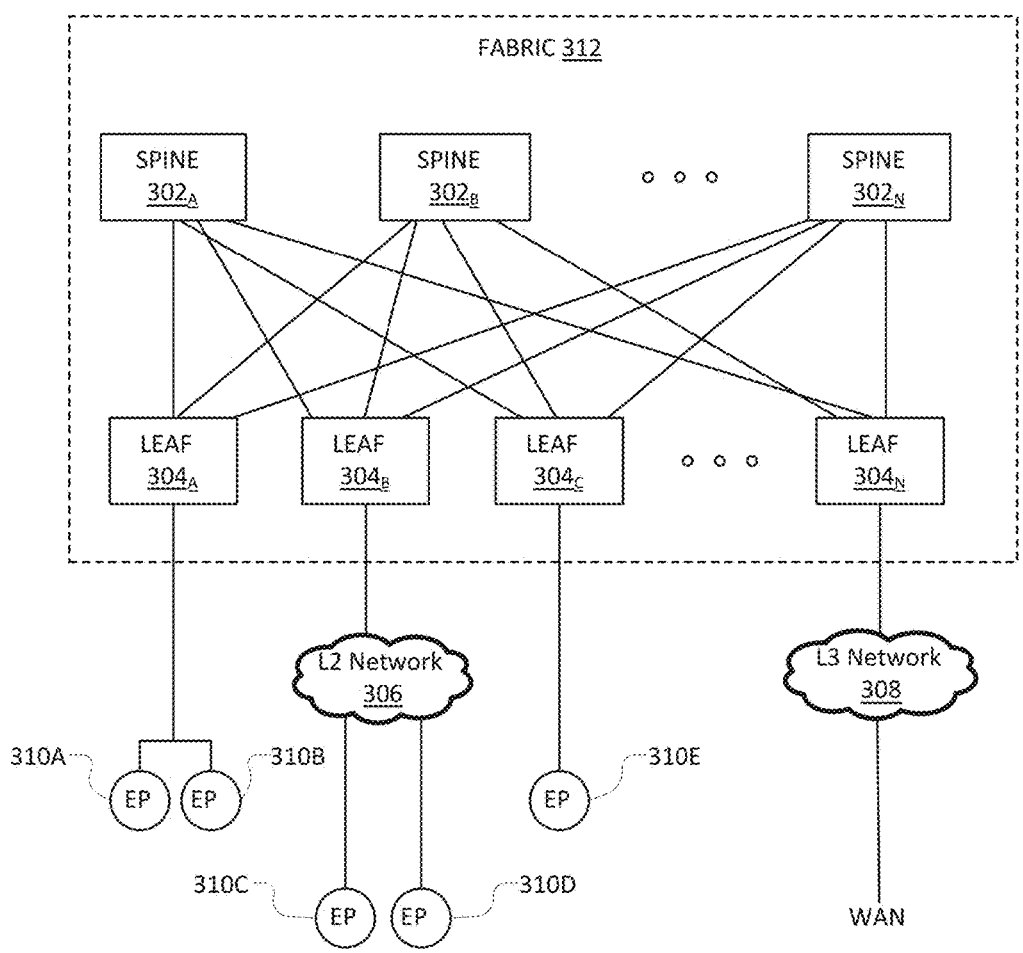
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$ ... $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
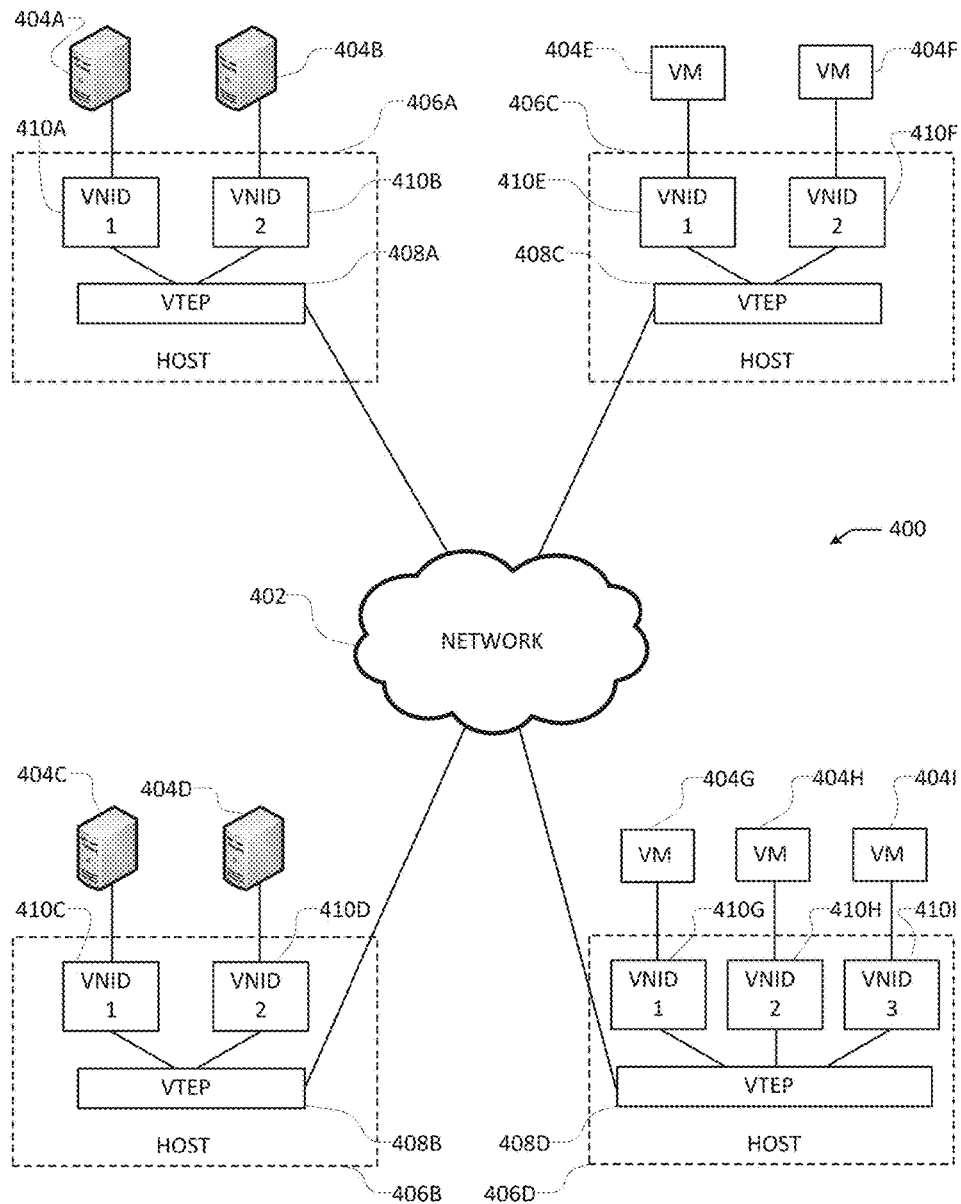
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Figure 5:
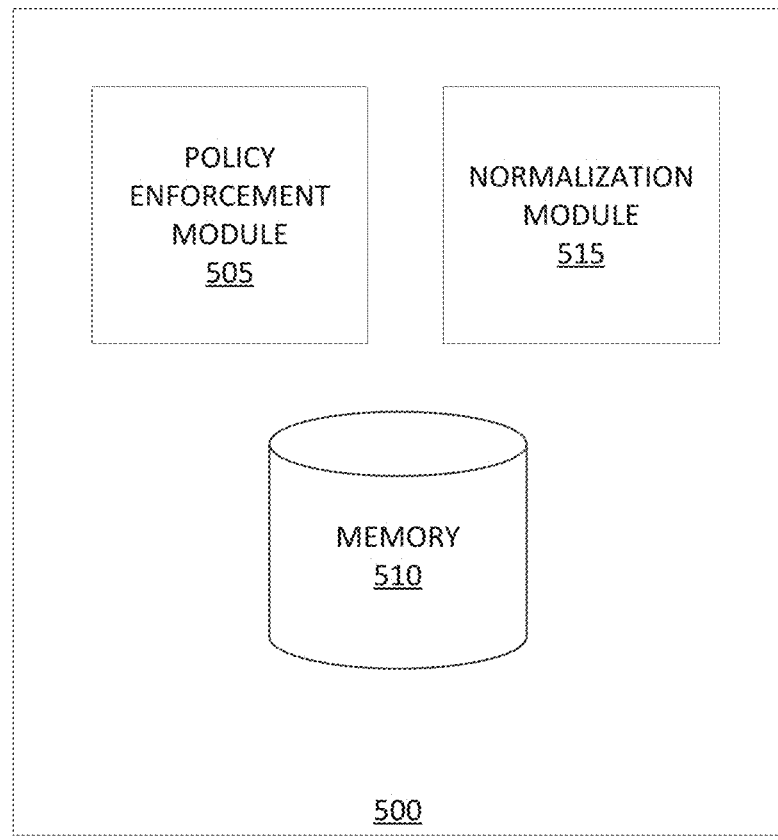
FIG. 5 illustrates an example system embodiment of a networking device configured to enforce access control policies in a computing network

FIG. 5 illustrates an example system embodiment of a networking device 500 configured to enforce access control policies in a computing network. The networking device 500 can be made up of one or more computing nodes in a computing network. For example, the networking device 500 can be made up of one or more switches, routers, end points, computing devices, etc., or combination thereof in the computing network.

The networking device 500 can be configured to facilitate connected data transfer sessions between nodes in the computing network and enforce access control policies. A connected data transfer session can be an established connection between computing nodes to transfer data. For example, a connected data transfer session can be implemented using a protocol such as the Transmission Control Protocol (TCP). To establish a connected data transfer session, the networking device 500 can facilitate a negotiation between the computing nodes to establish a socket to socket virtual connection that remains open throughout the duration of the connected data transfer session.

Once the networking device 500 establishes a connected data transfer session between two computing nodes, the networking device can act as an intermediary between the two computing nodes to transmit data via the connected data transfer session. Additionally, the networking device 500 can be configured to enforce policies in relation to connected data transfer sessions. The policies can place restriction on data communications between end points in the computing network, such as whether data transmissions between endpoints should be granted or denied. For example, the networking device 500 can maintain and utilize an Access Control List (ACL) that dictates whether data transmissions between endpoints should be granted or denied. Each ACL entry can identify an appropriate action (e.g., allow or deny a transmission) based on transmission data associated with the data transmission. Examples of transmission data can include the source port, destination port, source end point group, destination end point group, whether the transmission is an acknowledgement, reset or fragment, etc.

As shown, networking device 500 can include policy enforcement module 505 and memory 510. Memory 510 can be configured to store an ACL dictating restrictions on communications between endpoints based on transmission data. For example, each entry in the ACL can include parameters for one or more data fields, such as source port, destination port, transmission type, source EPG, destination EPG, etc., as well as a corresponding action, such as allow or deny the transmission. Hence, a network administrator can use the ACL to set policies dictating restrictions on communications between the endpoints in the network.

Policy enforcement module 505 can be configured to use the ACL to enforce policies. For each data transmission received by the networking device 500, policy enforcement module 505 can be configured to gather transmission data from the incoming data transmission and use the transmission data to identify the appropriate ACL entry in memory 510. For example, policy enforcement module 505 can gather transmission data from a header of the data transmission, such as a source port value, destination port value, source EPG value, destination EPG value, whether the data transmission is an acknowledgement, reset or fragment, etc. Policy enforcement module 505 can use the gathered transmission data to identify the appropriate ACL entry and then perform the appropriate action (e.g., allow or deny the data transmission) based on the identified ACL entry.

To reduce the number of ACL entries necessary to enforce desired transmission policies, networking device 500 can include normalization module 515 that is configured to normalize transmission data to yield a resulting normalized data set. Normalizing transmission data can include reorganizing and/or modifying the transmission data according to a consistent normalization algorithm, which can result in a consistent data output for two or more data transmissions. For example, a normalization process and/or algorithm can include ordering the source and destination port values in ascending numerical order. Accordingly, after normalization, a first data transmission with a source port of 80 and a destination port of 120 and a second data transmission with a source port of 120 and a destination port of 80 will both yield a consistent normalized data set of [80, 120].

This can allow a single ACL entry to apply for data transmissions sent in either direction between two computing nodes and/or two EPGs. For example, without normalizing the transmission data, a data transmission with a source port of 80 and destination port of 120 requires a separate ACL entry than a data transmission with a source port of 120 and a destination port of 80. In contrast, normalizing the same two data transmissions will result in matching normalized data sets, and thus a single ACL entry for the normalized data set can be used to apply a single policy for both data transmissions.

Normalization module 515 can be configured to normalize transmission data based on any type of normalization algorithm. For example, in some embodiments, normalization module 515 can normalize transmission data by ordering the transmission data into ascending and/or descending order. This can include ordering all of the transmission data or one or more subsets of the transmission data into ascending and/or descending order. For example, the normalization module 515 can be configured to normalize transmission data by ordering the source and destination port in ascending order and the source and destination EPGs in ascending order.

In some embodiments, normalization module 515 can be configured to normalize transmission data by performing one or more Boolean functions on the transmission data, such as AND, OR, XOR, NOT, etc. For example, transmission data can include flags indicating whether a data transmission is an acknowledgement, fragment, reset, etc., and normalization module 515 can perform one or more Boolean functions on the flag data to result in a normalized data set. As an example, normalization module 515 can be configured to perform an OR function on the acknowledgement flag and the reset flag. Accordingly, a single rule can be used for data transmissions that are an acknowledgement and/or a reset.

In some embodiments, normalization module 515 can be configured to generate new data field values and/or flags as part of the normalization process. The newly generated values and/or flags can be included in the resulting normalized data set. For example, normalization module 515 can create a new flag that indicates the directionality of the data transmission (e.g., which port value represents the source endpoint or EPG and which port value represents the recipient).

To accomplish this, normalization module 515 can set the directionality flag value based on whether the source port value or destination port value was ordered first to create the normalized data set. For example, the directionality flag can be set to 1 if the source port value is ordered before the destination port value in the normalized data set and the directionality flag can be set to 0 if the destination port value is listed before the source destination port value in the normalized data set. The directionality flag can useful when an administrator would like to create a separate policy for transmissions between two end points and/or EPGs based on directionality, rather than have a single policy for transmission sent between the two in either direction. Additionally, normalization module 515 can perform Boolean functions on the newly generated values and/or flags, such as the directionality flag.

Figure 6:
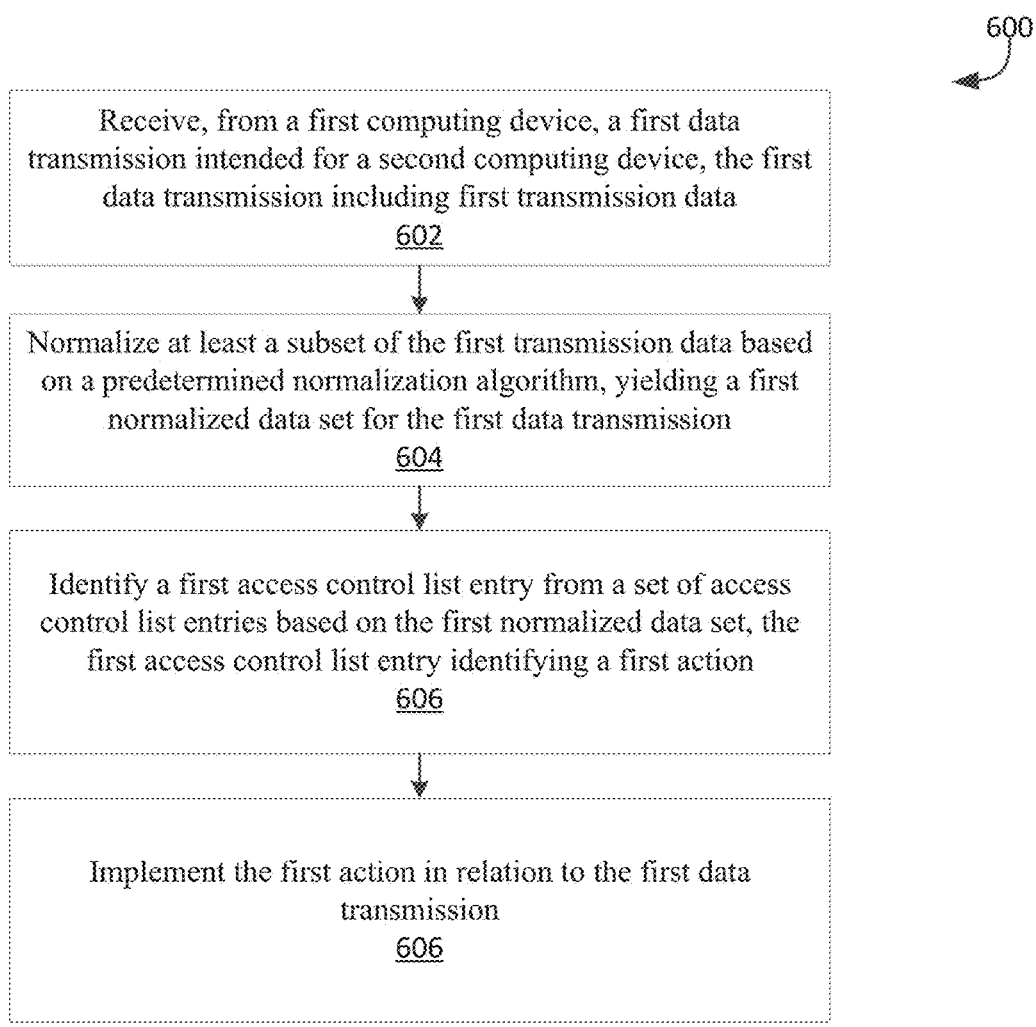
FIG. 6 illustrates one example method of a networking device enforcing policies for data transmissions.

Having disclosed some basic system components and concepts, the disclosure now turns to the example method shown in FIG. 6. For the sake of clarity, the method is described in terms of the systems shown in FIGS. 1-5. The steps outlined herein are example and can be implemented in any combination thereof, including combinations that exclude, add, or modify certain steps.

FIG. 6 illustrates one example method of a networking device 500 enforcing policies for data transmissions. At step 602, the networking device 500 can receive, from a first computing device, a first data transmission intended for a second computing device, the first data transmission including first transmission data. The networking device 500 can facilitate a connected data transfer sessions between the first and second computing devices and act as an intermediary between the two. The transmission data can be data describing the data transmission, such as a source port, destination port, source EPG, destination EPG, etc.

At step 604, the networking device 500 can normalize at least a subset of the first transmission data based on a predetermined normalization algorithm, yielding a first normalized data set for the first data transmission. The networking device 500 can gather the transmission data from a header of the data transmission. The predetermined normalization algorithm can be any type of known algorithm, method, steps, instructions, etc., that can be used to reorganize, modify and or generate data from the transmission data to generate the normalized data set. For example, the normalization algorithm can include ordering transmission data in ascending and/or descending order, performing Boolean functions, generating new data fields, etc.

At step 606, the networking device 500 can identify a first access control list entry from a set of access control list entries based on the first normalized data set, the first access control list entry identifying a first action. Each entry in the access control list can be associated with a specific and or a set of normalized data sets along with a corresponding (e.g., allow or deny the data transmission). The networking device 500 can identify the entry in the access control list that corresponds to the normalized data set for the first data transmission (e.g., matches and/or includes the normalized data set for the data transmission).

At step 608, the networking device 500 can implement the first action in relation to the first data transmission. For example, if the first action is to allow the data transmission, the networking device 500 can transmit the data transmission to its intended recipient (i.e., the second computing device). As another example, if the first action is to deny the data transmission, the networking device 500 can deny the first data transmission (e.g., not transmit the first data transmission to its intended recipient; notify the first computing device that the first data transmission has been denied, etc.).

Figure 7A:
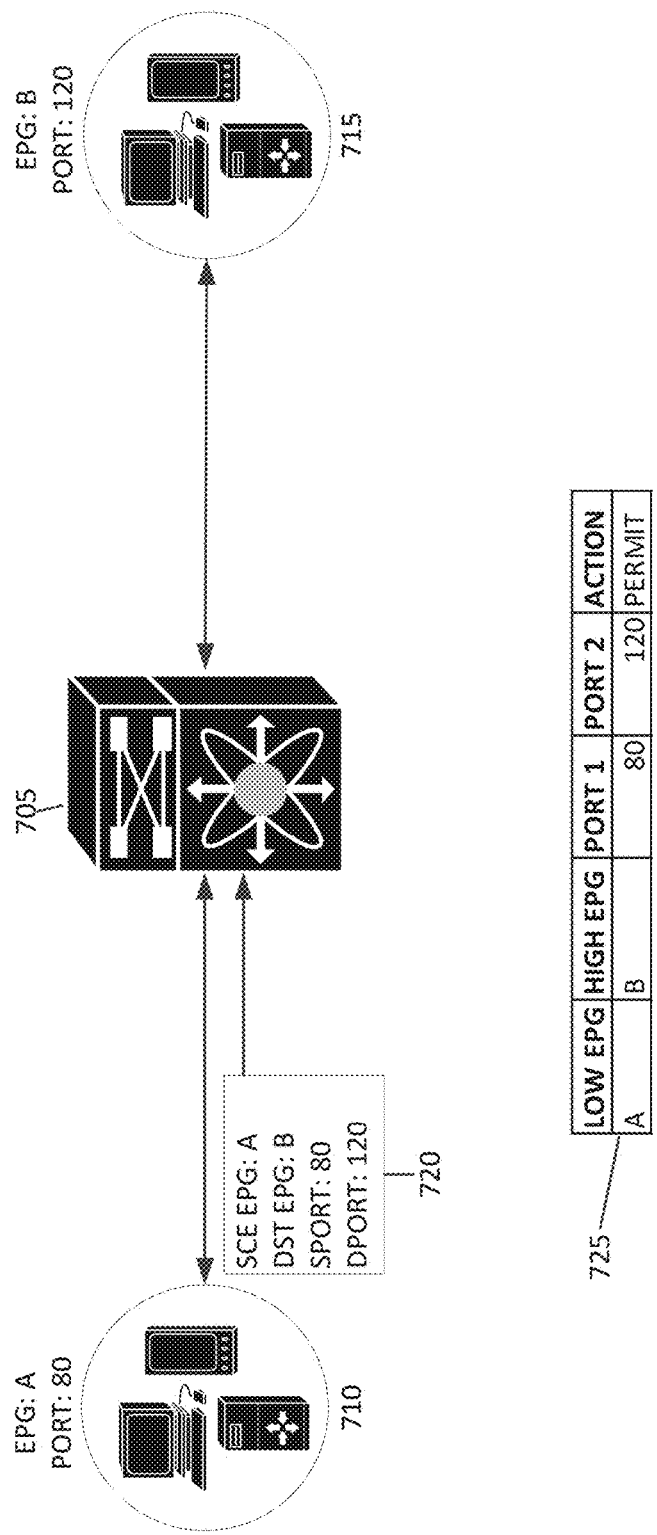
FIGS. 7A and 7B illustrate an example of a networking device enforcing policies on data transmissions between endpoints.
Figure 7B:
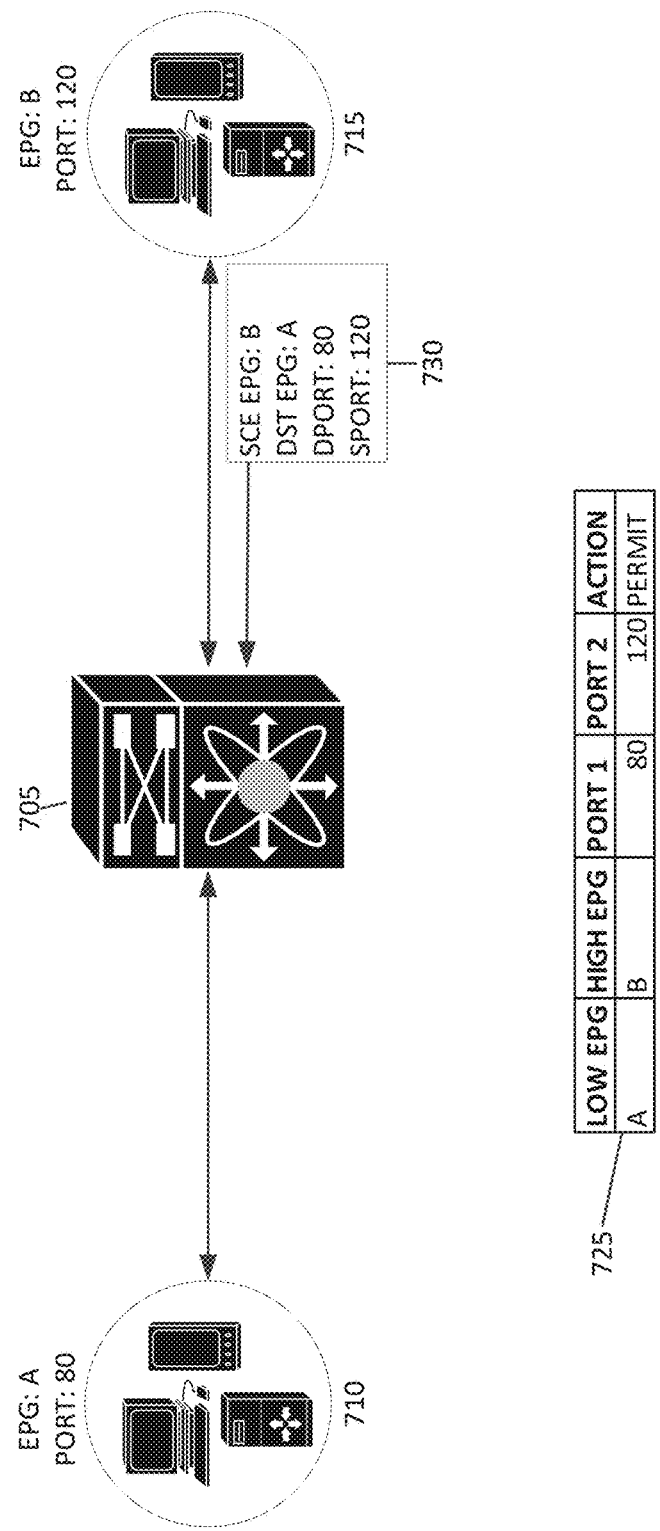

FIGS. 7A and 7B illustrate an example of a networking device 705 enforcing policies on data transmissions between endpoints. As shown, in FIG. 7A, networking device 705 is facilitating a connected data transfer session between endpoint 710 and endpoint 715. Endpoint 710 belongs to EPG A and is assigned port 80 and endpoint 715 belongs to EPG B and is assigned to port 120.

As shown, networking device 705 can receive data transmission 720 that was sent by endpoint 710 and intended for endpoint 715 as part of a connected data transfer session. Networking device 705 can use an ACL to enforce predetermined policies by normalizing transmission data associated with data transmission 720, identifying the appropriate entry in the ACL and implementing the desired action.

Networking device 705 can gather transmission data from data transmission 720. As shown, the transmission data of data transmission 720 includes a source EPG value of A, destination EPG value of B, source port value of 80 and destination end point value of 120. In this example, networking device 705 can use a normalization algorithm that orders the EPG and port values into ascending order, respectively, such that the resulting normalized data set will be: low EPG value, high EPG value, low port value, high port value. Accordingly, the resulting normalized data set for data transmission 720 will be: A, B, 80, 120.

Networking device 705 can use the normalized data set to identify a corresponding ACL entry. As shown, ACL entry 725 has a low EPG value of A, high EPG value of B, low port value of 80 and a high port value of 120, and therefore corresponds to the normalized data set of data transmission 720. ACL entry 725 identifies an action of permit. Accordingly, networking device 705 can permit data communication 720 by transmitting the data communication to its intended recipient (i.e., endpoint 715).

FIG. 7B shows networking device 705 receiving data transmission 730 that was sent by endpoint 715 and intended for endpoint 710 as part of a connected data transfer session. Networking device 705 can normalize the transmission data associated with data transmission 730 to enforce the appropriate policy. As shown, data transmission 730 has a source EPG value of B, Destination EPG value of A, source port value of 120 and destination port value of 80. After normalization by networking device 705, the resulting normalized data set for data communication 730 will be: A, B, 80, 120; which is the same as the normalized data set for data transmission 720 shown in FIG. 7A. Accordingly, ACL entry 725 can correspond to and be used to enforce a policy on both data transmission, even though the data transmissions have differing transaction data.

Figure 8A:
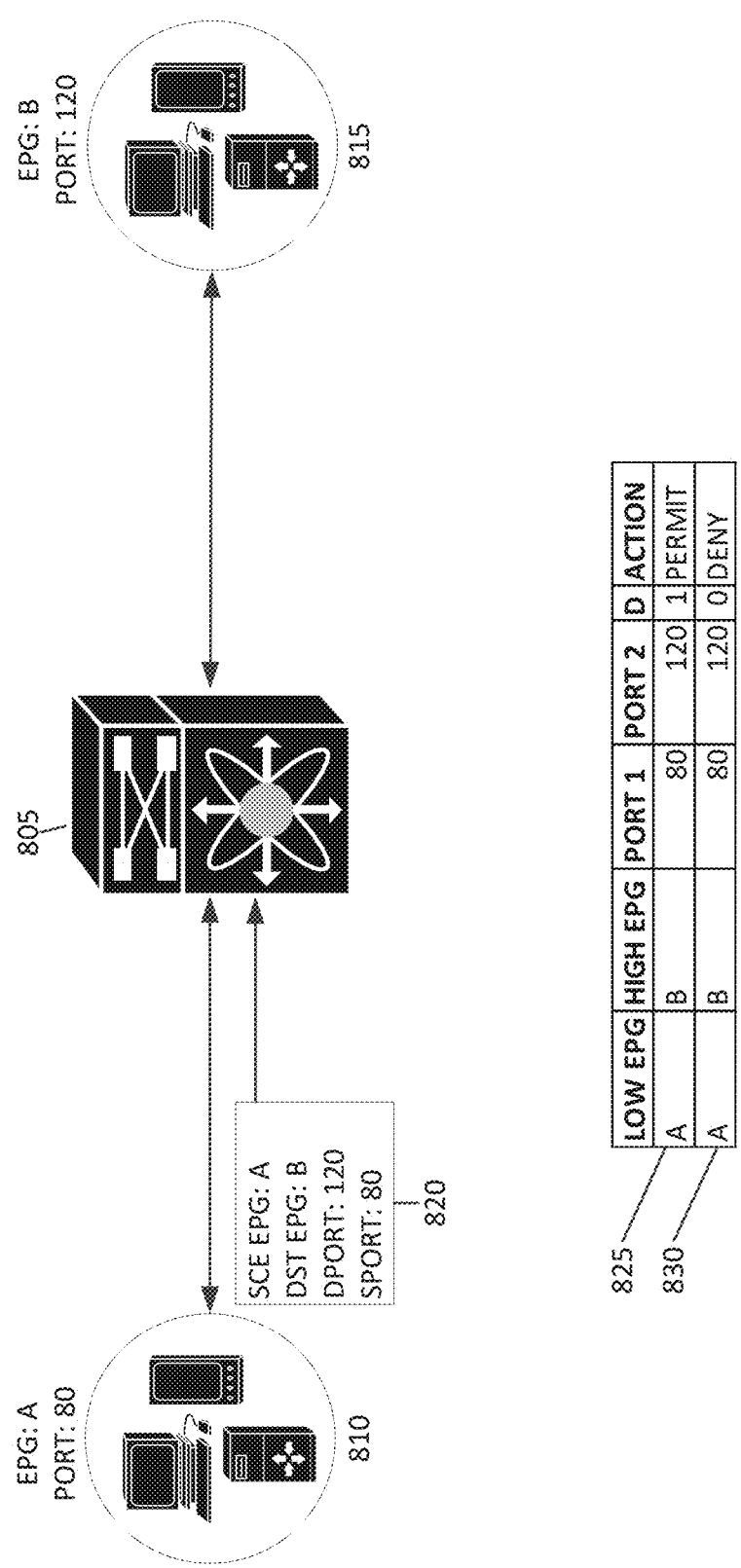
FIGS. 8A-8C illustrate another example of a networking device enforcing policies on data transmissions between endpoints.
Figure 8B:
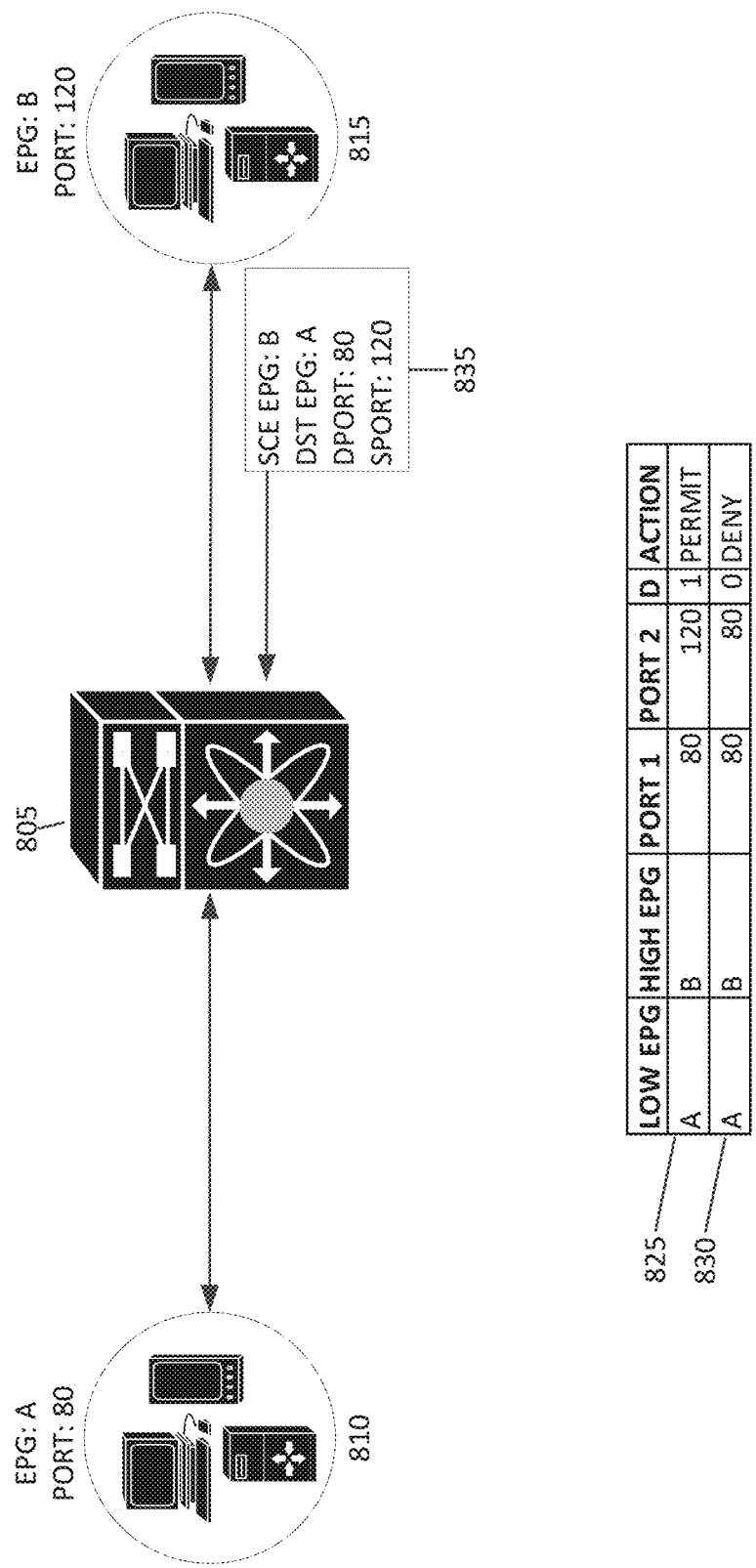
Figure 8C:
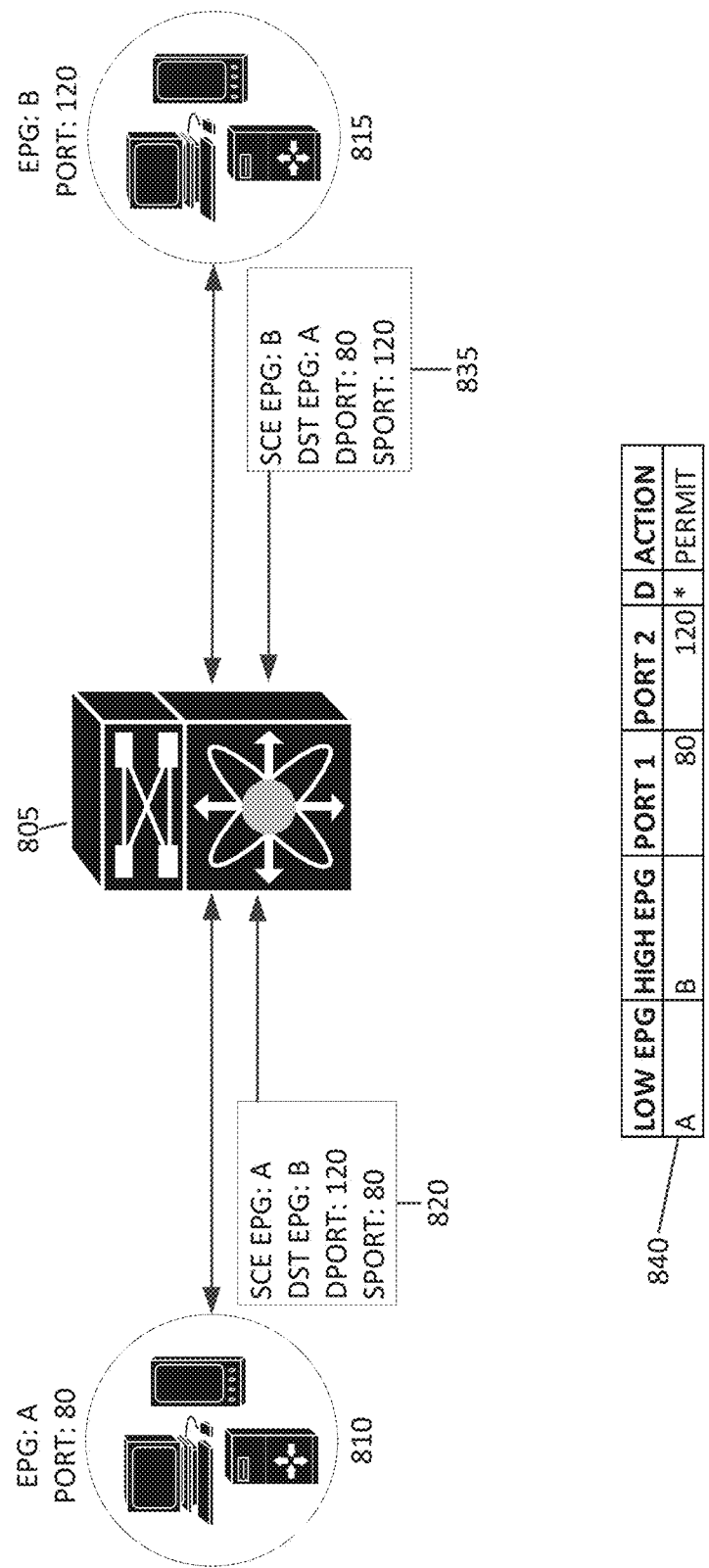

FIGS. 8A-8C show another example of a networking device 805 enforcing policies on data transmissions between endpoints. As shown, in FIG. 8A, networking device 805 is facilitating a connected data transfer session between endpoint 810 and endpoint 815. Endpoint 810 belongs to EPG A and is assigned port 80 and endpoint 815 belongs to EPG B and is assigned to port 820.

As shown, networking device 805 can receive data transmission 820 that was sent by endpoint 810 and intended for endpoint 815 as part of a connected data transfer session. Networking device 805 can use an ACL to enforce predetermined policies by normalizing transmission data associated with data transmission 820, identifying the appropriate entry in the ACL and implementing the desired action.

As shown, the transmission data for data transmission 820 includes a source EPG value of A, destination EPG value of B, source port value of 80 and destination end point value of 120. In this example, networking device 805 can use a normalization algorithm that orders the EPG and port values into ascending order, respectively, and calculates a directionality flag that indicates the direction in which the data transmission is being sent. For example, the directionality flag can be set as 1 if the source port value is listed before the destination port value in the normalized data set, and the directionality flag can be set as 0 if the destination port value is listed before the source port value in the normalized data set. Accordingly, the resulting normalized data set will be: low EPG value, high EPG value, low port value, high port value, and directionality flag. In this example, the source port value (80) is less than the destination port value (120), so the source port value will be listed prior to the destination port value in the normalized data set. Accordingly, the directionality flag will be set to 1 and the resulting normalized data set for data transmission 820 will be: A, B, 80, 120, 1.

Networking device 805 can use the normalized data set to identify a corresponding ACL entry. As shown, ACL entry 825 and ACL entry 830 each have a low EPG value of A, high EPG value of B, low port value of 80 and a high port value of 120, however ACL entry 825 has a destination flag value of 1 and ACL entry 830 has a destination flag value of 0. Accordingly, ACL entry 825 corresponds to the normalized data set of data transmission 820. ACL entry 825 identifies an action of permit and so networking device 805 can permit data communication 820 by transmitting the data communication to its intended recipient (i.e., endpoint 815).

FIG. 8B shows networking device 805 receiving data transmission 835 that was sent by endpoint 815 and intended for endpoint 810 as part of a connected data transfer session. Networking device 805 can normalize the transmission data associated with data transmission 835 to enforce the appropriate policy. As shown, data transmission 835 has a source EPG value of B, Destination EPG value of A, source port value of 120 and destination port value of 80. In this instance, the source port value (120) is greater than the destination port value (80) and so the directionality flag will be set to 0. After normalization by networking device 805, the resulting normalized data set for data communication 835 will be: A, B, 80, 120, 0; which corresponds to ACL entry 830, rather than ACL entry 825. As shown, ACL entry 830 identifies an action of deny and so networking device 805 can deny data communication 835. Accordingly, an administrator can use the directionality flag to implement different policies for communications between two endpoints based on the directionality of data communication.

Alternatively, to set a single policy for the data communications between the endpoints, regardless of directionality, the administrator can create a single ACL entry that accepts either value for the directionality flag. FIG. 8C shows an example of an ACL entry 840 configured to accept any value for the directionality flag. Accordingly, both data transmission 820 and 835 will correspond to ACL entry 840 after normalization.

Figure 9A:
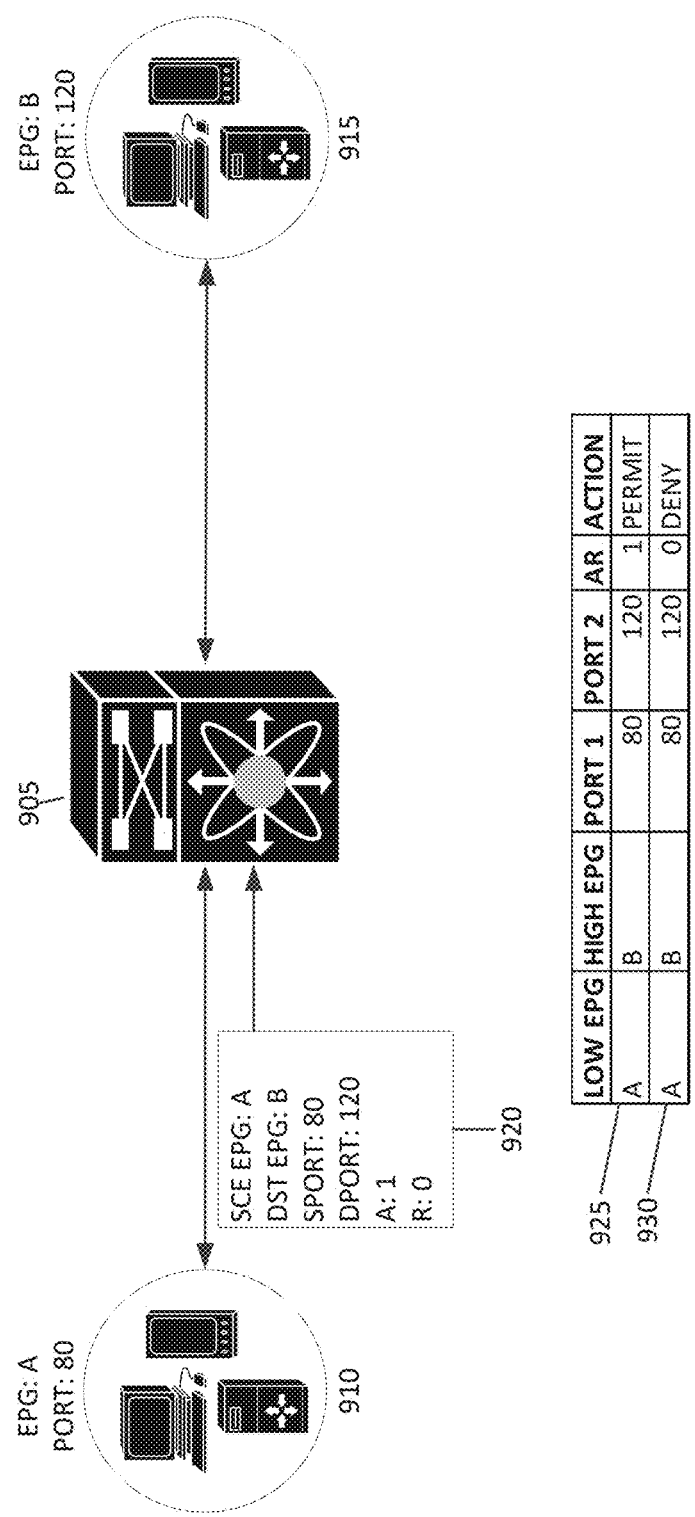
FIGS. 9A-9C illustrate an example of a networking device enforcing policies on data transmissions between endpoints.
Figure 9B:
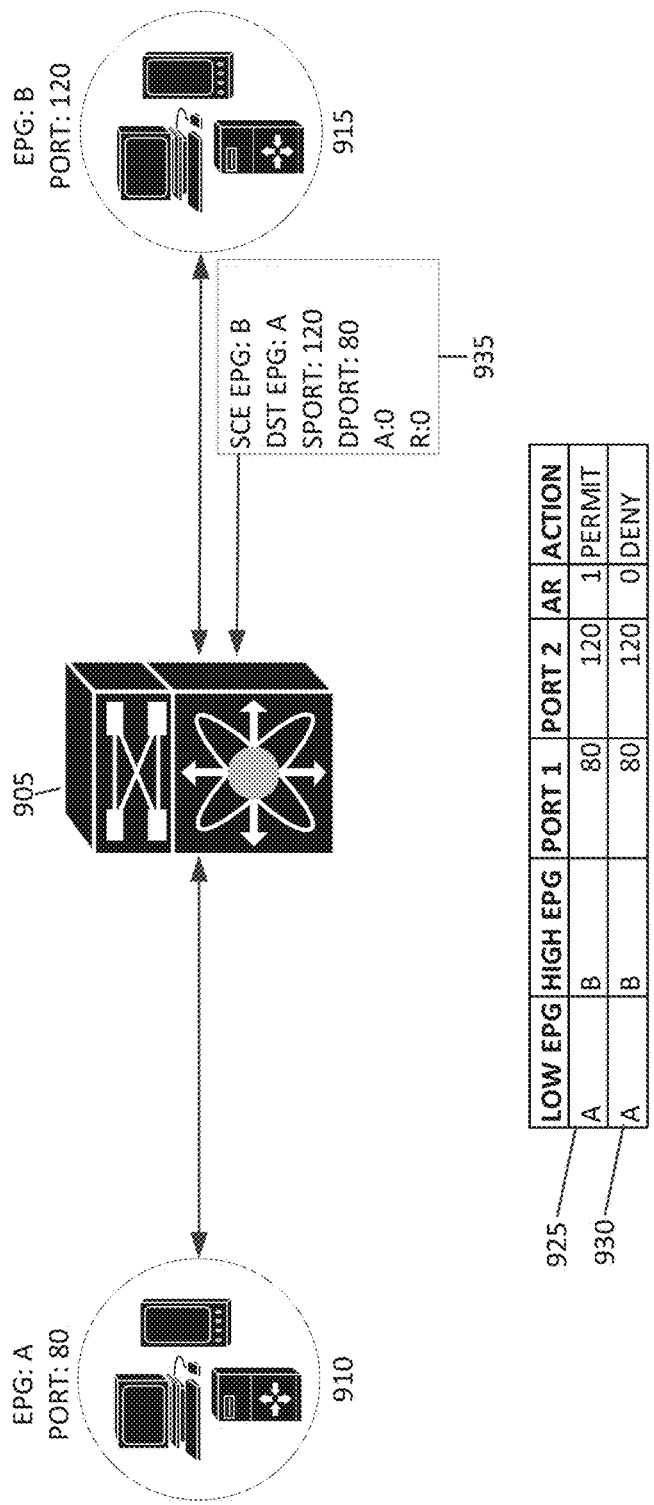

FIGS. 9A and 9B show another example of a networking device 905 enforcing policies on data transmissions between endpoints. As shown, in FIG. 9A, networking device 905 is facilitating a connected data transfer session between endpoint 910 and endpoint 915. Endpoint 910 belongs to EPG A and is assigned port 80 and endpoint 915 belongs to EPG B and is assigned to port 120.

As shown, networking device 905 can receive data transmission 920 that was sent by endpoint 910 and intended for endpoint 915 as part of a connected data transfer session. Networking device 905 can use an ACL to enforce predetermined policies by normalizing transmission data associated with data transmission 920, identifying the appropriate entry in the ACL and implementing the desired action.

As shown, the transmission data for data transmission 920 includes a source EPG value of A, destination EPG value of B, source port value of 80, destination port value of 120, acknowledgement flag value of 1 and a reset flag value of 0. In this example, networking device 805 can use a normalization algorithm that orders the EPG and port values into ascending order, respectively, and calculates an AR flag that indicates whether the data communication is an acknowledgement and/or a reset. For example, the AR flag can be set by performing an OR function on the acknowledgement flag value and the reset flag value. Accordingly, the AR flag will be set to 1 if either the acknowledgement flag value or the reset flag value is 1, and the AR flag will be set to 0 when both the acknowledgement flag value and the reset flag values are 0.

The resulting normalized data set will be: low EPG value, high EPG value, low port value, high port value, and AR flag. In this example, the acknowledgement flag is set to 1 so the AR flag will be set to 1. Accordingly, the resulting normalized data set for data transmission 920 will be: A, B, 80, 120, 1.

Networking device 905 can use the normalized data set to identify a corresponding ACL entry. As shown, ACL entry 925 and ACL entry 930 each have a low EPG value of A, high EPG value of B, low port value of 80 and a high port value of 120, however ACL entry 925 has AR flag value of 1 and ACL entry 930 has an AR flag value of 0. Accordingly, ACL entry 925 corresponds to the normalized data set of data transmission 920. ACL entry 925 identifies an action of permit and so networking device 905 can permit data communication 920 by transmitting the data communication to its intended recipient (i.e., endpoint 915).

FIG. 9B shows networking device 905 receiving data transmission 935 that was sent by endpoint 915 and intended for endpoint 910 as part of a connected data transfer session. Networking device 905 can normalize the transmission data associated with data transmission 935 to enforce the appropriate policy. As shown, data transmission 935 has a source EPG value of B, Destination EPG value of A, source port value of 120, destination port value of 80, acknowledgement flag value of 0 and reset flag value of 0. In this instance, the AR flag will be 0 since both the acknowledgement and reset flag values are 0. After normalization by networking device 905, the resulting normalized data set for data communication 935 will be: A, B, 80, 120, 0; which corresponds to ACL entry 930, rather than ACL entry 925. As shown, ACL entry 930 identifies an action of deny and so networking device 905 can deny data communication 935.

Figure 9C:
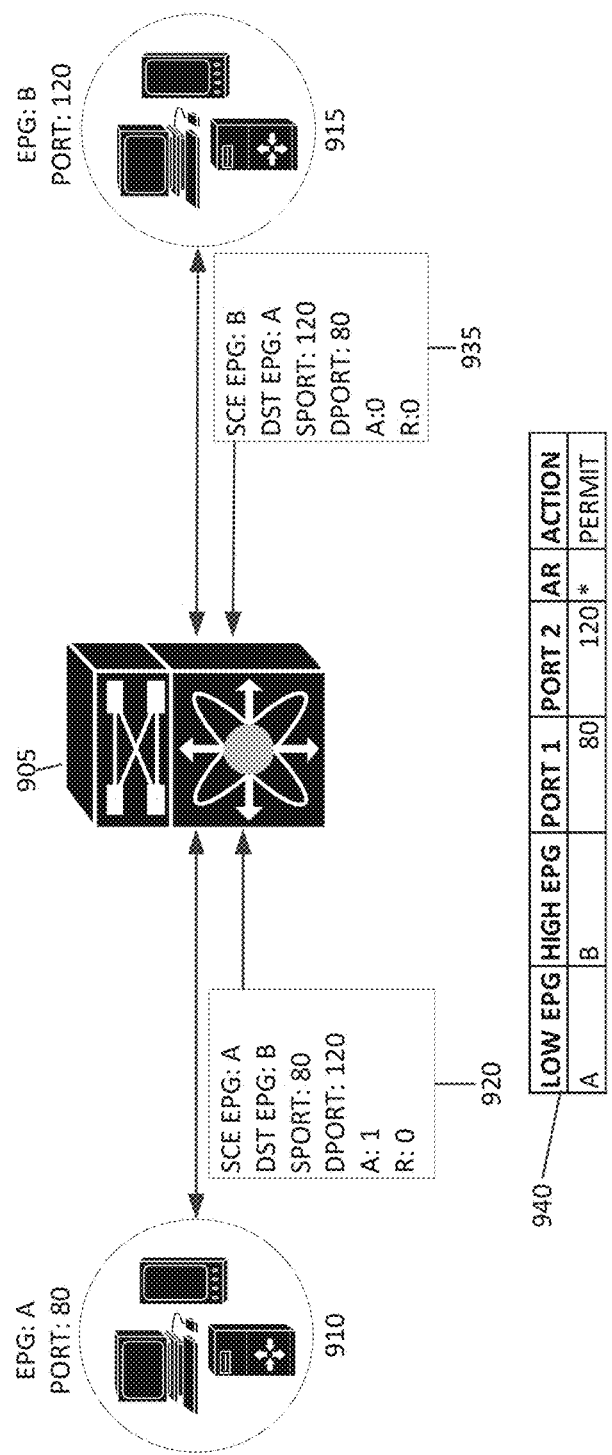

Alternatively, to set a single policy for the data communications between the endpoints, regardless of whether the data communication is an acknowledgement or reset, the administrator can create a single ACL entry that accepts either value for the AR flag. FIG. 9C shows an example of an ACL entry 940 configured to accept any value for the AR flag. Accordingly, both data transmission 920 and 935 will correspond to ACL entry 940 after normalization.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a networking device, from a first computing device, a first data transmission intended for a second computing device, the first data transmission including first header data;
determining, by the networking device, a first normalized data set for the first data transmission including a first field value and a second field value in a sequential order, the first field value corresponding to a first port value associated with the first computing device, and the second field value corresponding to a second port value associated with the second computing device;
identifying, by the networking device, a first access control list entry from a set of access control list entries based on the first field value and the second field value in the sequential order, the first access control list entry identifying a first action; and
implementing, by the networking device, the first action in relation to the first data transmission.

2. The method of claim 1, further comprising:
receiving, from the second computing device, a second data transmission intended for the first computing device, the second data transmission including second header data; and
determining a second normalized data set including the first field value and the second field value in the sequential order.

3. The method of claim 2, further comprising:
identifying the first access control list entry from the set of access control list entries based on the first field value and the second field value in the sequential order; and
implementing the first action in relation to the second data transmission.

4. The method of claim 2, further comprising:
identifying a second access control list entry, different than the first access control list entry, from the set of access control list entries based on a third field value of the second normalized data set, the second access control list entry identifying a second action, different than the first action; and
implementing the second action in relation to the second data transmission.

5. The method of claim 1, further comprising:
generating a directional flag value based on whether the first port value associated with the first computing device and the second port value associated with the second computing device were reordered to yield the first normalized data set.

6. The method of claim 1, wherein the first normalized data set further comprises a Boolean function on a first flag value and a second flag value included in the first header data.

7. A networking device comprising:
one or more computer processors; and
memory storing instructions that, when executed by the one or more computer processors, cause the networking device to:
receive, from a first computing device, a first data transmission intended for a second computing device, the first data transmission including first header data;
determine a first normalized data set for the first data transmission including a first field value and a second field value in a sequential order, the first field value corresponding to a first port value associated with the first computing device, and the second field value corresponding to a second port value associated with the second computing device;
identify a first access control list entry from a set of access control list entries based on the first field value and the second field value in the sequential order, the first access control list entry identifying a first action; and
implement the first action in relation to the first data transmission.

8. The networking device of claim 7, wherein the instructions further cause the networking device to:
receive, from the second computing device, a second data transmission intended for the first computing device, the second data transmission including second header data; and
determine a second normalized data set including the first field value and the second field value in the sequential order.

9. The networking device of claim 8, wherein the instructions further cause the networking device to:
identify the first access control list entry from the set of access control list entries based on the first field value and the second field value in the sequential order; and
implement the first action in relation to the second data transmission.

10. The networking device of claim 9, wherein the instructions further cause the networking device to:
identify a second access control list entry, different than the first access control list entry, from the set of access control list entries based on a third field value of the second normalized data set, the second access control list entry identifying a second action, different than the first action; and
implement the second action in relation to the second data transmission.

11. The networking device of claim 8, wherein the instructions further cause the networking device to:
generate a directional flag value based on whether the first port value associated with the first computing device and the second port value associated with the second computing device were reordered to yield the first normalized data set.

12. The networking device of claim 7, wherein the first normalized data set further comprises a Boolean function on a first flag value and a second flag value included in the first header data.

13. A non-transitory computer-readable medium storing instructions that, when executed by a networking device, cause the networking device to:
receive, from a first computing device, a first data transmission intended for a second computing device, the first data transmission including first header data;
determine a first normalized data set for the first data transmission including a first field value and a second field value in a sequential order, the first field value corresponding to a first port value associated with the first computing device, and the second field value corresponding to a second port value associated with the second computing device;
identify a first access control list entry from a set of access control list entries based on the first field value and the second field value in the sequential order, the first access control list entry identifying a first action; and
implement the first action in relation to the first data transmission.

14. The non-transitory computer-readable medium of claim 13, wherein the instructions further cause the networking device to:
receive, from the second computing device, a second data transmission intended for the first computing device, the second data transmission including second header data; and
determine a second normalized data set including the first field value and the second field value in the sequential order.

15. The non-transitory computer-readable medium of claim 14, wherein the instructions further cause the networking device to:
identify the first access control list entry from the set of access control list entries based on the first field value and the second field value in the sequential order; and
implement the first action in relation to the second data transmission.

16. The non-transitory computer-readable medium of claim 15, wherein the instructions further cause the networking device to:
identify a second access control list entry, different than the first access control list entry, from the set of access control list entries based on a third field value of the second normalized data set, the second access control list entry identifying a second action, different than the first action; and
implement the second action in relation to the second data transmission.

17. The non-transitory computer-readable medium of claim 14, wherein the instructions further cause the networking device to:
generate a directional flag value based on whether the first port value associated with the first computing device and the second port value associated with the second computing device were reordered to yield the first normalized data set.

18. The non-transitory computer-readable medium of claim 13, wherein the first normalized data set further comprises a Boolean function on a first flag value and a second flag value included in the first header data.

* * * * *